United States Patent [19]

Honan

[11] Patent Number: 5,433,578
[45] Date of Patent: Jul. 18, 1995

[54] RETRACTABLE SUSPENSION

[75] Inventor: William, Jr. Honan, Queensland, Australia

[73] Assignee: TrailerTech Industries, Inc., New York, N.Y.

[21] Appl. No.: 197,001

[22] Filed: Feb. 15, 1994

Related U.S. Application Data

[63] Continuation of Ser. No. 32,535, Mar. 15, 1993, abandoned, which is a continuation of Ser. No. 921,369, Jul. 28, 1992, abandoned, which is a continuation of Ser. No. 595,449, Oct. 11, 1990, abandoned.

[30] Foreign Application Priority Data

Oct. 13, 1989 [AU] Australia ............... 42867/89

[51] Int. Cl.⁶ ................................. B60P 1/02
[52] U.S. Cl. .................. 414/476; 280/43.24; 280/704; 414/481; 414/482
[58] Field of Search ........... 414/474, 476, 471, 481, 414/483, 495, 475, 482, 484, 485; 280/43.18, 43.14, 43.2, 43.24, 656, 704; 180/24.02

[56] References Cited

U.S. PATENT DOCUMENTS

| | | | |
|---|---|---|---|
| 2,230,014 | 1/1941 | Raven | 414/495 X |
| 2,452,267 | 10/1948 | Schramm | 280/43.18 X |
| 2,599,717 | 6/1952 | Menzies | 280/43.14 X |
| 2,766,050 | 10/1956 | Stone | 280/43.18 |
| 2,806,710 | 9/1957 | Mascaro | 280/43.24 X |
| 2,807,381 | 9/1957 | Tegeler | 280/43.18 X |
| 2,827,187 | 3/1958 | Elmore | 414/476 |
| 2,835,400 | 5/1958 | Latzke | 280/43.18 |
| 2,934,228 | 4/1960 | Hillberg | 414/458 |
| 2,937,775 | 5/1960 | Funk, Jr. | 414/476 |
| 2,990,966 | 7/1961 | Schramm | 414/483 X |
| 3,044,646 | 7/1962 | Sperow | 414/476 |
| 3,113,686 | 12/1963 | Sundin | 414/495 |
| 3,143,749 | 8/1964 | Buchholz et al. | 280/43.2 X |
| 3,315,978 | 4/1967 | Chieger et al. | 180/24.02 X |
| 3,384,384 | 5/1968 | Diehl | 280/43.18 |
| 3,768,677 | 10/1973 | Moss | 414/476 |
| 3,866,935 | 2/1975 | Nelson | 414/476 X |
| 4,065,153 | 12/1977 | Pringle | 280/704 |
| 5,006,031 | 4/1991 | Fossing et al. | 414/476 X |

FOREIGN PATENT DOCUMENTS

| | | | |
|---|---|---|---|
| 1045105 | 5/1953 | France | 280/43.24 |
| 7706713 | 6/1976 | Netherlands | 280/43.18 |
| 0774380 | 5/1957 | United Kingdom | 280/43.2 |
| 2183559 | 6/1987 | United Kingdom | 414/485 |

*Primary Examiner*—Michael S. Huppert
*Assistant Examiner*—James W. Keenan
*Attorney, Agent, or Firm*—Amster, Rothstein & Ebenstein

[57] ABSTRACT

A vehicle includes at least one pair of wheels and a respective wheel support arm associated with each wheel for supporting the wheel for rotation, one end of each arm being pivotally coupled to the vehicle. A respective suspension component is secured to each arm and a mounting on the vehicle. A respective support strut has one end secured to the distal end of the suspension component. A respective guide member receives the one end of the strut and the distal end for movement therealong when the vehicle is moved between a travelling position and a loading position.

24 Claims, 6 Drawing Sheets

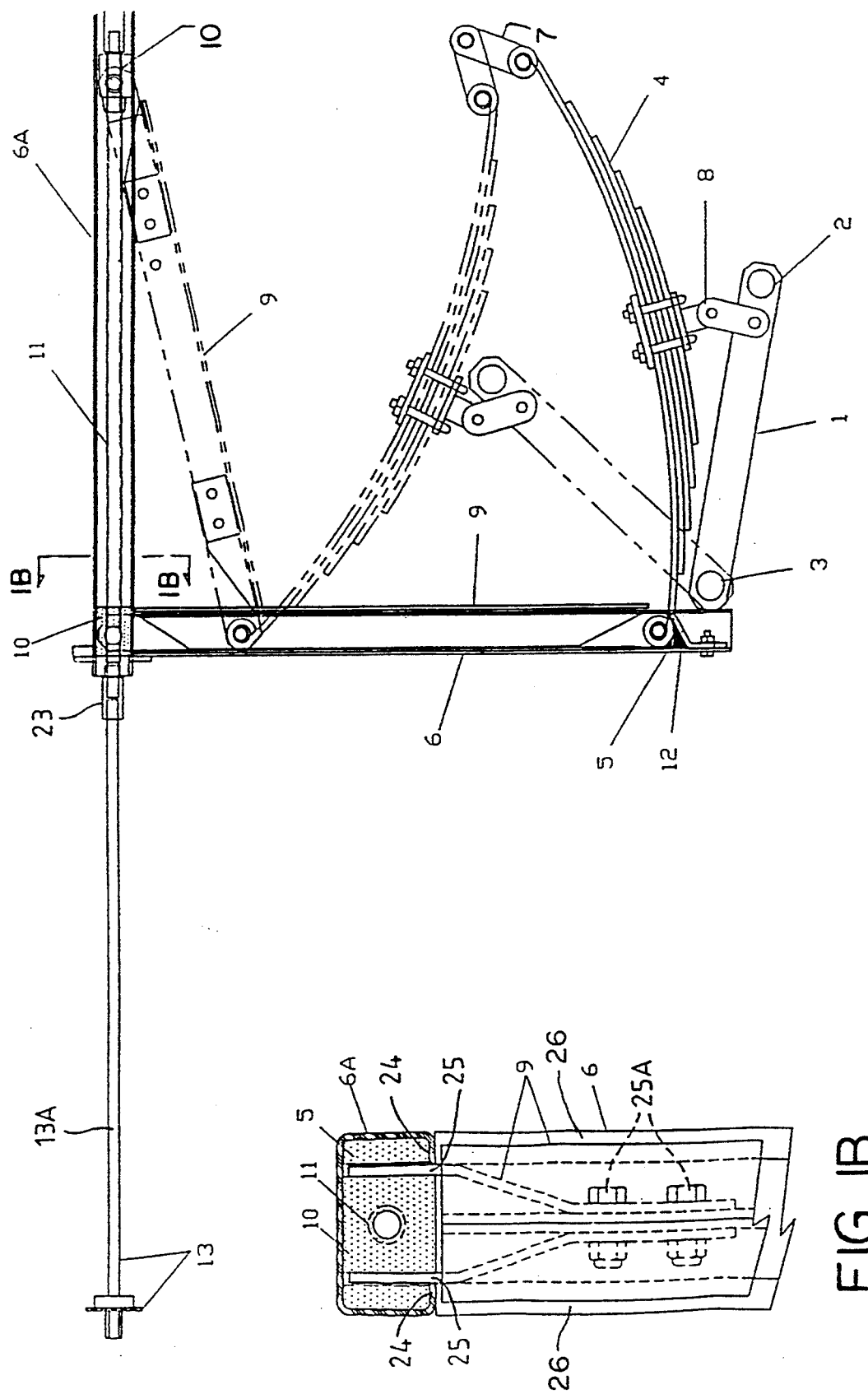

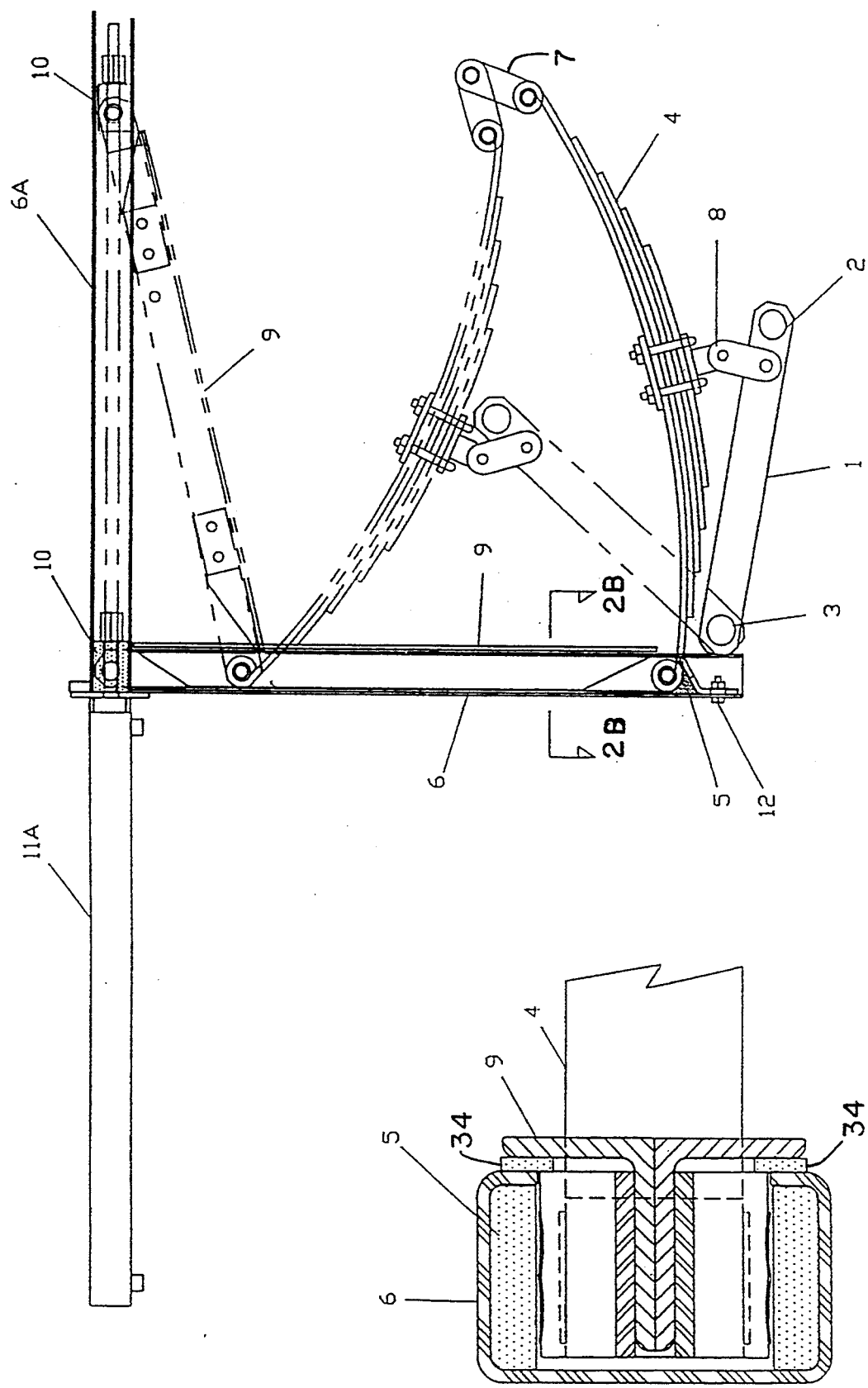

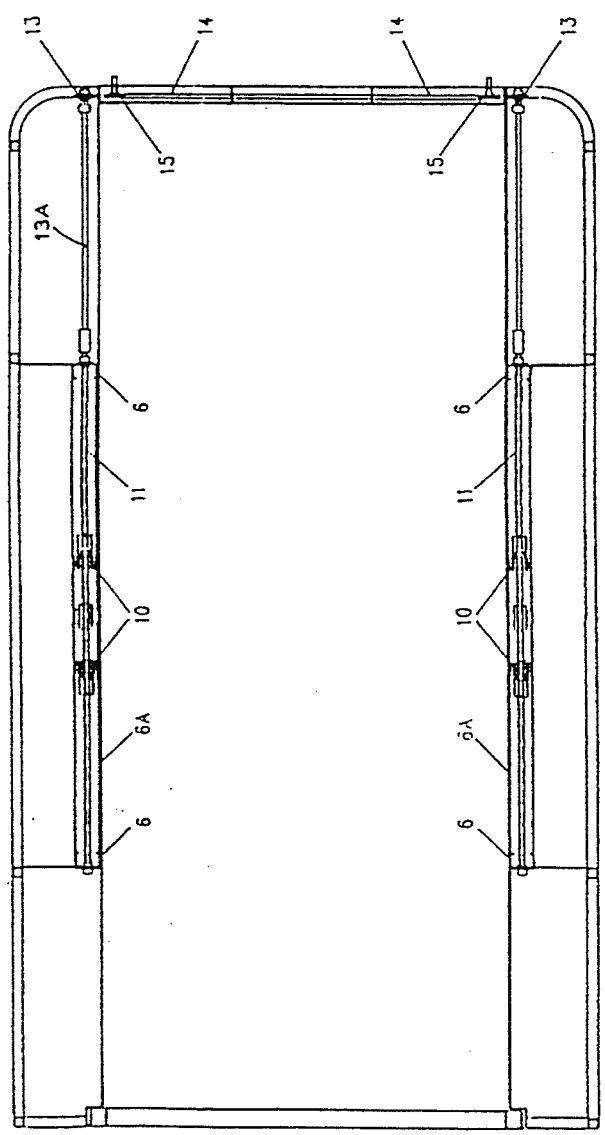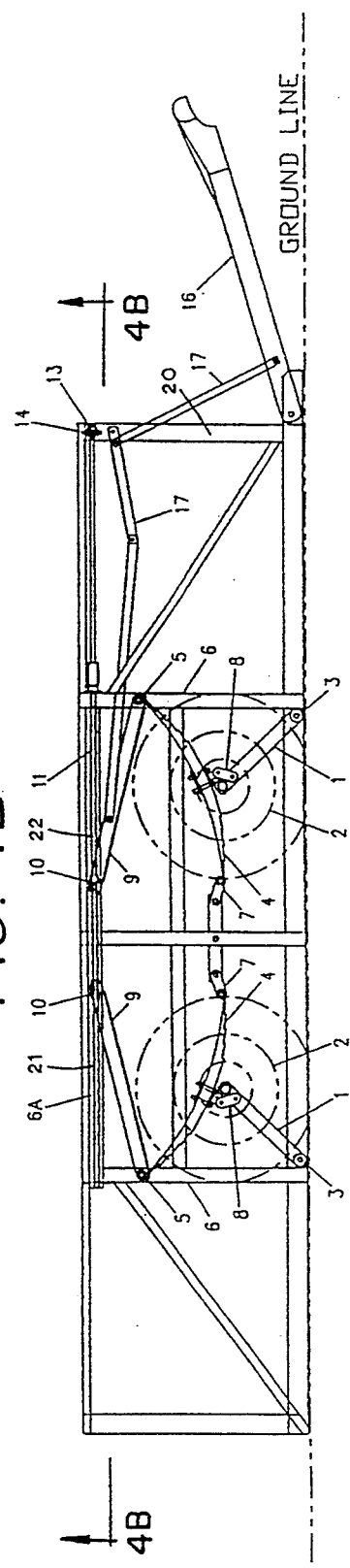

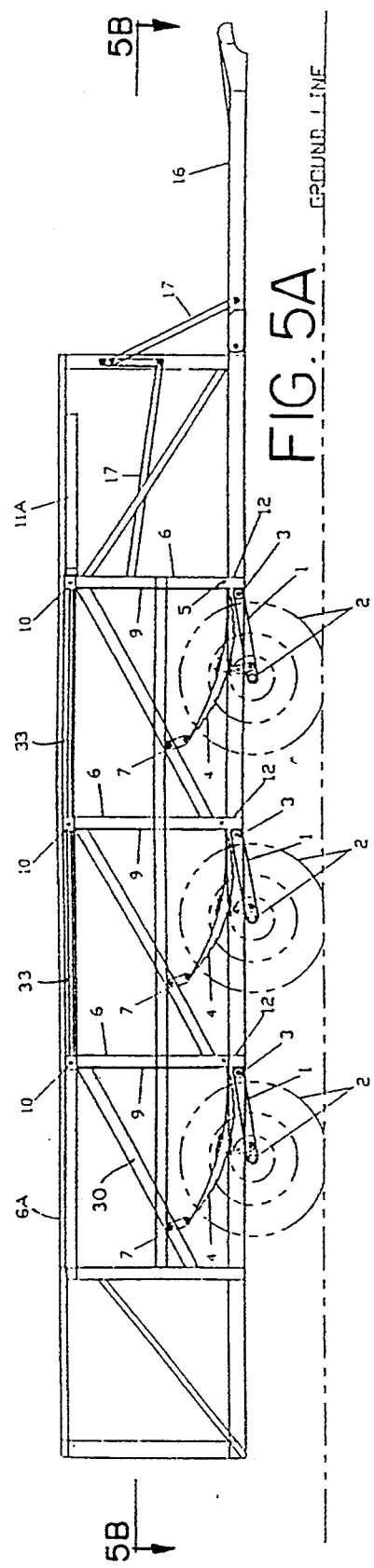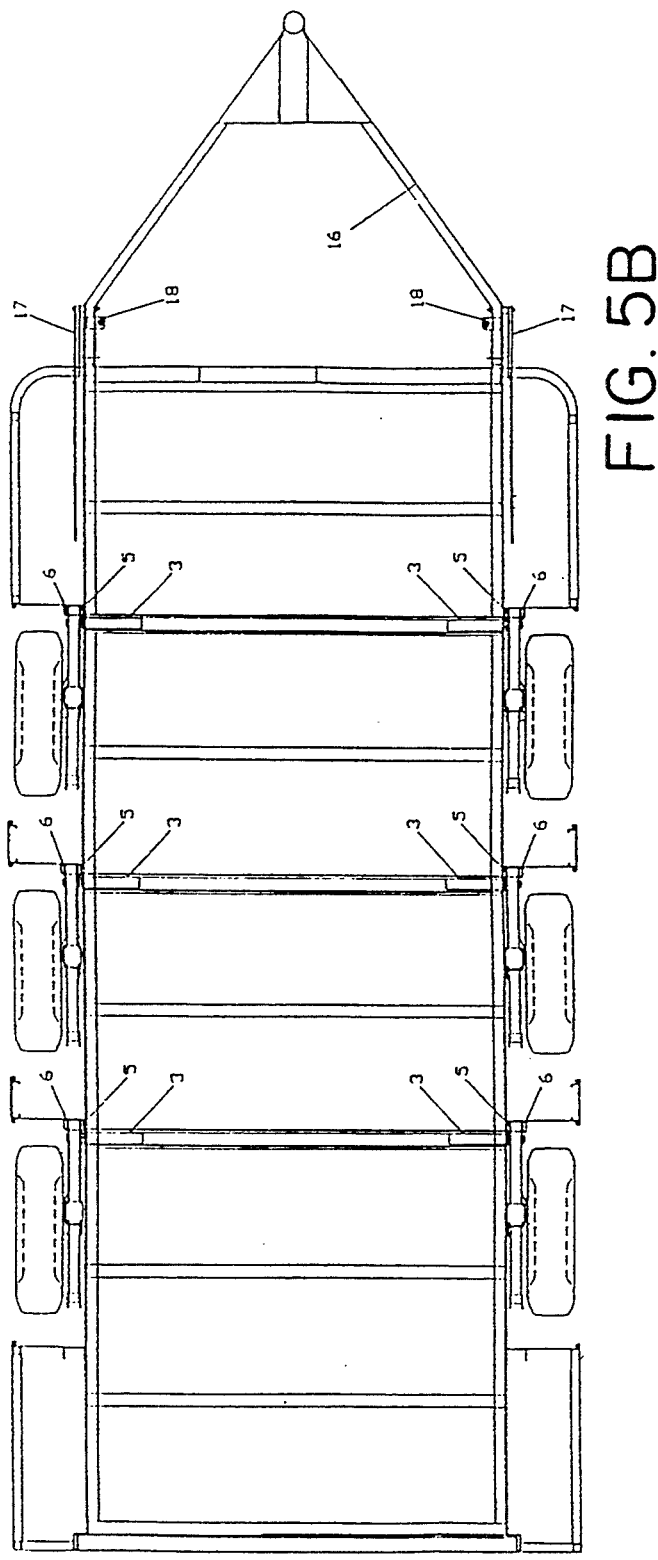

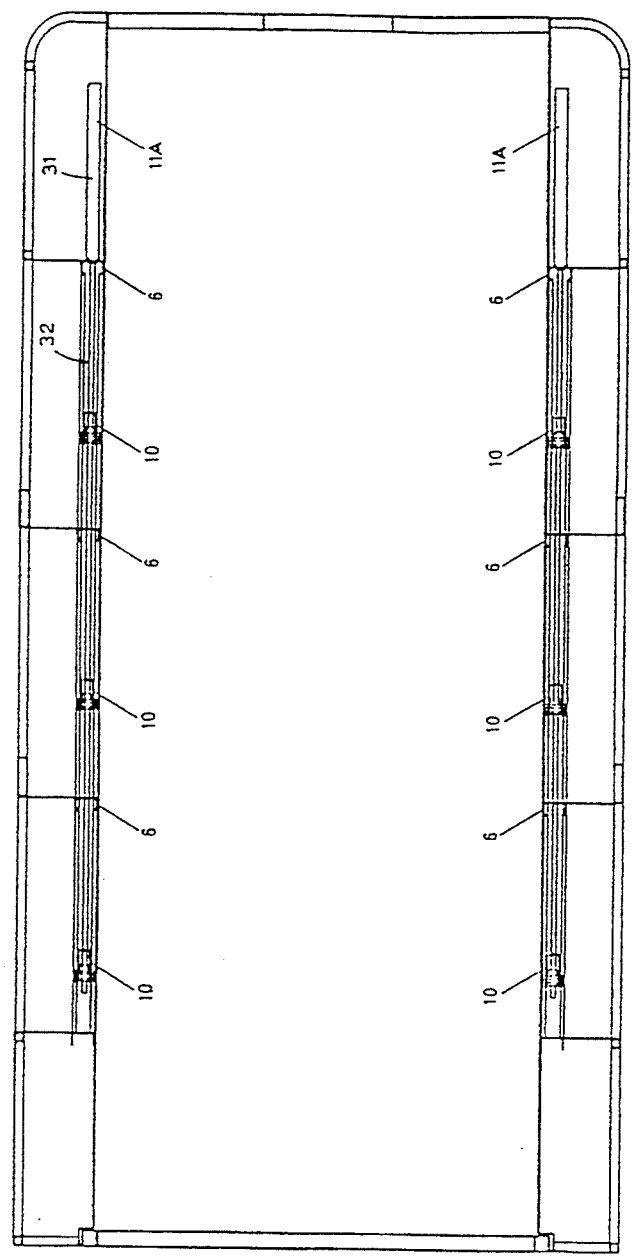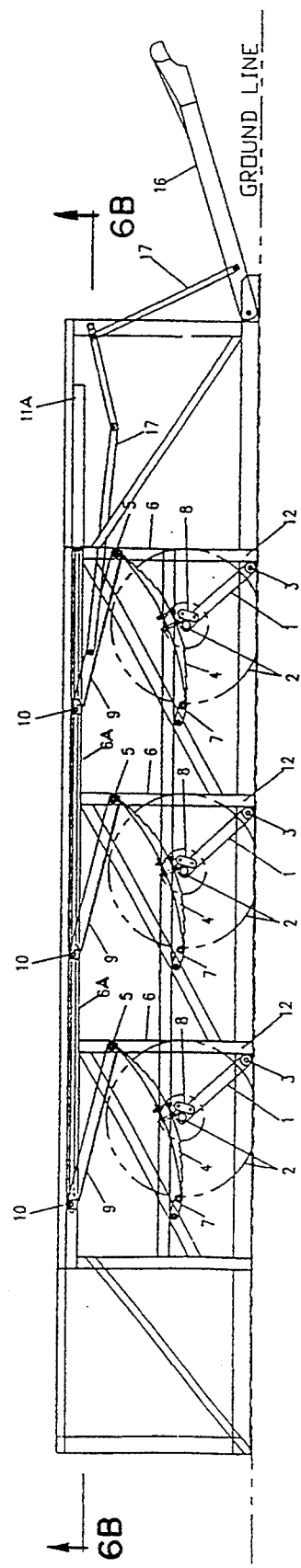

RETRACTABLE SUSPENSION

This is a continuation of application Ser. No. 08/032,535 filed on Mar. 15, 1993 itself a continuation of application Ser. No. 07/921,369, filed Jul. 28, 1992, itself a continuation of application Ser. No. 07/595,449 filed Oct. 11, 1990, all now abandoned.

RETRACTABLE SUSPENSION

BACKGROUND OF THE INVENTION

This invention relates to a retractable suspension for the wheels of a vehicle and in particular to a vehicle having a retractable suspension.

The invention will be described by way of example with reference to the vehicle being a towable vehicle such as a trailer or the like. It should be understood that this is by way of example only and that the invention is not limited to such vehicles.

Known trailers typically have a chassis terminating at a drawbar assembly or the like at one end thereof, a body mounted on the chassis and wheels secured to the chassis via suspension components. The body has a load receiving surface or bed and in use, that bed, when the drawbar assembly is secured to a towing vehicle, is spaced from the ground by a predetermined distance.

It is often difficult to load such a trailer because the bed is above ground level.

Numerous earlier proposals have been suggested for providing a trailer or vehicle with a bed which can be moved relative to the ground such that the bed may be moved between a raised towing position and a lowered loading position. With such proposals the disadvantage referred to above existing in known trailers was eliminated.

U.S. patent specification 2,230,014 discloses a trailer having a bed which could be raised or lowered with respect to the ground. The trailer had a generally U-shaped chassis when viewed in plan and the bed was coupled thereto by two boomerang shaped linkages. These linkages occur at longitudinally spaced positions along the chassis and are linked so that both of them could be moved by an hydraulic cylinder to raise and lower the bed. U.S. Pat. No. 2,934,228 and 3,468,440 disclose similar arrangements.

The difficulty with such earlier proposals was that they could not be readily adapted for vehicles other that trailers. In addition, the arrangements tended to be complex in construction.

U.K. patent specification 1,124,791 disclosed a retractable suspension for the wheels of a vehicle and in particular for towable vehicles such as trailers. This specification disclosed a trailer having tandem pairs of wheels. Each wheel was mounted on a free end of a wheel arm and the other end of the wheel arm was pivotally mounted to the vehicle chassis. A damper or suspension cylinder extended between that part of the arm to which the wheel is mounted and a lever. One end of the lever was pivotally mounted to the chassis adjacent the mount for the wheel arm and the other end of the lever had an hydraulic cylinder coupled to it. The cylinder joins the levers associated with a pair of wheels and extension of the cylinder caused the wheel arms to pivot to enable the bed of the vehicle to be lowered relative to the ground.

This U.K. specification disclosed a second embodiment where the lever referred to above was replaced by a leaf spring assembly. In both embodiments, one of the wheel arms formed a leading wheel arm and the other a trailing wheel arm.

Because the wheel arms were trailing and leading wheel arms the arrangement of the U.K. patent specification could not readily be adapted to operate with a vehicle having three pairs of wheels. In addition, the arrangement was such that extension of the cylinder caused the bed of the vehicle to move relative to the ground under the influence of gravity. Retraction of the cylinder effected lowering of the suspension and hence raising of the vehicle bed. During raising and lowering the wheel arms and levers were relatively unsupported.

It is an object of the present invention to at least minimise the disadvantages referred to above.

SUMMARY OF THE INVENTION

According to one aspect, the present invention provides a vehicle including at least one pair of wheels, a respective wheel support arm associated with each said wheel for supporting the wheel for rotation, one end of said arm being pivotally coupled to the vehicle, a respective suspension component secured to the arm and a mounting on the vehicle and having a distal end, a respective support strut having one end secured to the distal end of the suspension component and a respective guide member for receiving the distal end and the one end of the strut and guiding the one end of the strut and the distal end for movement therealong when the vehicle is moved between a travelling position and a loading position.

In the travelling position the suspension components and wheels are lowered and therefore a load carrying bed of the vehicle is raised. In the loading position the suspension components and wheels are raised and the bed may then be adjacent the ground or surface along which the vehicle normally travels.

The suspension component is preferably a spring. In a particularly preferred form of the invention the spring is a leaf spring assembly having a plurality of leaves.

The spring assembly may have a saddle member secured to it between its ends and this saddle member may facilitate attachment to the wheel support arm. Attachment of the spring assembly to the arm may be at or adjacent the wheel carried by the arm.

An attachment member may attach the spring assembly to the arm for pivot movement at least relative to the attachment member but preferably the attachment member also is free to pivot relative to the arm. The attachment member may be a relatively short link member. Preferably the attachment member is a shackle pivotally attached to and extending between the saddle member and the arm.

The guide member is preferably an elongate guide member. The guide member in one embodiment is channel shaped. Preferably the guide member is substantially C shaped and its free edges may have short inwardly directed return flanges. The guide channel in use may extend generally vertically aligned and may form part of a vehicle frame or body. The guide channel, when the vehicle is in a travelling position may receive the strut between its return flanges.

The channel may be adapted to provide for relatively frictionless guiding of the distal end of the spring assembly as the vehicle is moved between its travelling and loading positions. Friction resisting material may line the channel. Friction resisting strips may extend along opposed interior walls of the channel. Preferably, friction resisting blocks line the channel. Alternatively, the distal end of the spring assembly and/or the one end of the strut have slide blocks secured to them. The friction resisting material or blocks may be made of nylon or other suitable material.

Preferably a seal is provided between the channel and the strut such that contaminants are prevented from entering the channel when the vehicle is in the travelling position. Sealing strips may be positioned on those faces of the return flanges directed towards the strut.

The end of the spring assembly secured to the vehicle may be pivotally secured thereto. The end may be directly secured to the vehicle. Preferably an attachment member is employed. The attachment member may directly attach the end of the spring assembly to the vehicle in the case of a vehicle with independent multiple wheel pairs. Alternatively, where the vehicle has load sharing tandem wheel pairs the attachment member may attach the end of the spring assembly to a load sharing arm. The attachment member may be a short link. Preferably the attachment member may comprise a shackle. The shackle is preferably pivotally secured to the vehicle or the load sharing arm (as the case may be) and more preferably is also pivotally secured to the end of the spring assembly.

The strut may be an elongate member. In one embodiment the strut is substantially T shaped in transverse cross section and may be made from two angle shaped elongate members arranged back to back to form a central flange. The T shaped strut, in use is positioned so that the oppositely directed flanges are adjacent the return flanges of the support channel (when the vehicle is in the travelling position) and the intermediate flange projects into the support channel. The one end of the strut may have an attachment portion facilitating its attachment to the distal end of the spring assembly. The attachment portion is preferably forked and the distal end is received by the forked end of the strut. The attachment portion may be provided by two outwardly directed plates secured to opposed sides of the intermediate flange of the strut. As mentioned, the one end of the strut may carry a slide block. The slide block may be secured to the outwardly directed plates which provide the forked attachment portion to which the distal end of the spring assembly is secured.

The other end of the strut may also have an attachment portion like that described and for a purpose mentioned below.

The vehicle may have at least one pair of wheels and each wheel has associated with it the components just described. That is, each wheel may have a spring assembly, support arm, guide member and strut with related shackles and the wheels are arranged on opposite sides of the vehicle. The vehicle may have two or more pairs of wheels.

Where the vehicle has two tandem pairs of wheels the suspension components and wheels may be configured either as an independent multi-wheel system or as a load sharing tandem wheel system. Where the vehicle has three or more pairs of wheels it is convenient that the system be configured as an independent multi-wheel system.

The other end of the strut may also be guided for movement when the vehicle is moved between its travelling and loading positions. A strut support guide member may be present for this purpose. The strut support guide member may be an elongate member. A channel member is preferred. The channel member may have the same sectional shape as the channel shaped member which guides the distal end of the spring assembly for movement. Preferably the other end of the strut is also provided with a slide block as discussed or the guide channel is lined with friction resisting material as previously discussed.

A drive may be included with the vehicle for causing the vehicle to move between the travelling and loading positions. The drive may move the other end of the strut in the strut support guide. The drive may be pneumatic, hydraulic or mechanical in nature. Preferably the drive is either hydraulic or mechanical in nature.

Where the drive is hydraulic an hydraulic cylinder assembly may be used for moving the other end of the strut. Where there is one pair of wheels a respective cylinder assembly is coupled to the strut associated with each wheel. Thus, the cylinder assembly with a cylinder and rod may have its rod coupled to the other end of the strut. The cylinder is preferably double acting so that the movement between the travelling and loading positions in either direction may be powered. Alternatively, the cylinder may be single acting such that only the movement from the loading to the travelling position is powered—movement in the other direction may be achieved under the influence of gravity.

Where there are two or more pairs of wheels the rod may be coupled to the other end of one strut and an extension member may extend from the rod to the other end of the next strut on the same side of the vehicle as the first strut. If there are three pairs of wheels then an extension member may extend between the other ends of the second and third struts on each side of the vehicle. In this way the struts associated with each wheel may be moved. Clearly a separate cylinder assembly and any necessary extension members are present on each side of the vehicle. Such an arrangement is suitable for an independent multi-wheel system. The extension members may comprise extension rods.

Where the drive is mechanical in nature a threaded drive shaft may extend along each side of the vehicle. The other end of the or each strut may be coupled to the shaft via thread traveller nuts or the like. Such travellers cause the end of the strut to move longitudinally of the vehicle on rotation of the shaft.

Where there is a tandem load sharing system one of the wheels (on one side of the vehicle) may be provided with its support arm in a leading configuration and the other wheel (on that side) may have its arm in a trailing configuration. Thus, the struts will be arranged in mirror symmetry and the drive shaft is provided with respective threaded sections of opposite hand.

Where the system has multiple pairs of wheels in an independent multi-wheel system the shaft need not have threaded sections of opposite hand and is simply threaded along its length.

The shaft is preferably contained within the strut support guide member and journalled for rotation. The free end of each shaft may terminal in a drive element such as a sprocket to facilitate rotation either manually by a crank or by an electric or hydraulic drive. It is desired that the shafts on each side of the vehicle be driven together and thus the shafts may be mechanically linked. A chain, shaft or belt may be used for this purpose.

BRIEF DESCRIPTION OF THE DRAWING

The invention will now be described by way of example with reference to the drawings in which:

FIG. 1A is a detailed view of a suspension raising and lowering arrangement according to one embodiment;

FIG. 1B is an enlarged sectional view thereof taken along the line 1B—1B of FIG. 1A;

FIG. 2A is another embodiment of a suspension raising and lowering arrangement;

FIG. 2B is an enlarged sectional view thereof taken along the line 2B—2B of FIG. 2A;

FIG. 4A is a side elevational view of the vehicle of FIGS. 3A and 3B, with the suspension raised;

FIG. 4B is a sectional view thereof taken along the line 4B—4B of FIG. 4A;

FIG. 5A is a side elevational view of an alternative vehicle embodiment including an arrangement according to FIGS. 2A and 2B, with the suspension lowered;

FIG. 5B is a sectional view thereof taken along the line 5B—5B of FIG. 5A;

FIG. 6A is a side elevational view of the vehicle of FIGS. 5A and 5B, with the suspension raised; and FIG. 6B is a sectional view thereof taken along the line 6B—6B of FIG. 6.

DETAILED DESCRIPTION OF THE PREFERRED EMBODIMENTS

Figure 3A:
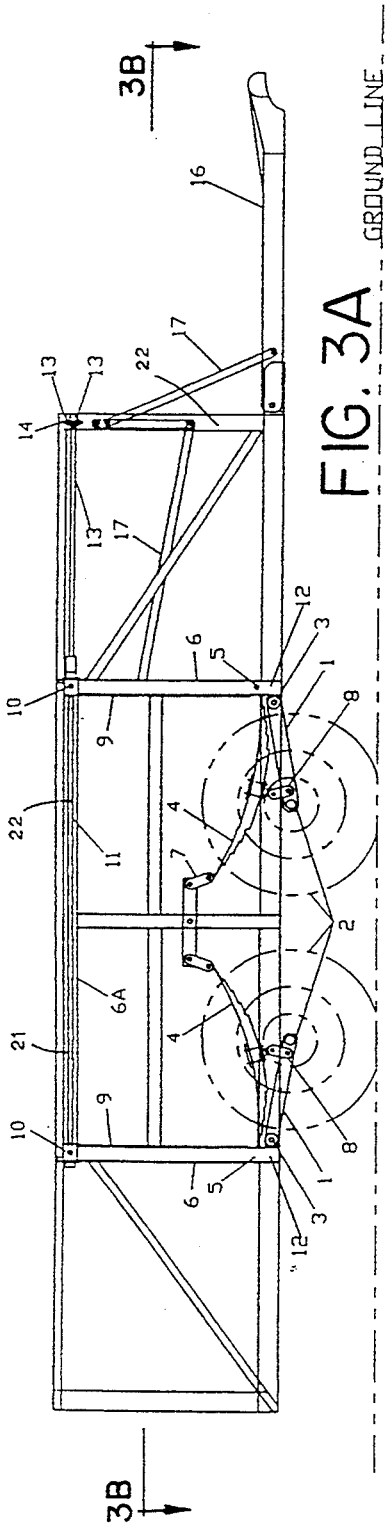
FIG. 3A is a side elevational view of a vehicle incorporating the arrangement of FIGS. 1A and 1B, with the suspension lowered.

The vehicle of FIGS. 3A and 3B and FIGS. 4A and 4B has two pairs of wheels 2 on each side and rotationally mounted to respective wheel support arms 1. Arms 1 are pivotally mounted to the vehicle by axles 3 which extend across the vehicle. A suspension component 4, which in this case is a leaf spring assembly, extends between a mount on the vehicle provided by pivoting shackle 7 and equalizing arm and strut 9 (more clearly shown in FIG. 1A). The arm 1 is coupled to component 4 via shackle 8. Shackle 8 is pivotally coupled to both the component 4 and arm 1.

The strut 9 normally extends along a guide member 6 when the suspension is lowered and the vehicle is in the travelling position shown in FIG. 3A. Each strut terminates in a slide block adapted for screw threaded engagement with drive screw 11. Screw 11 locates within a support guide member 6A. Extension shaft 13A forms an extension to screw 11 and terminates in a sprocket 13.

The tow bar assembly 16 is pivotally connected to the vehicle and the pivotable movement is controlled by linkages 17. Three linkages 17 are present and one of them is articulated. One linkage 17 extends between the strut 9 and a forward frame member 20 of the vehicle. The other linkage extends between assembly 16 and the other linkage. In this way, the assembly 16 can pivot to maintain a horizontal attitude of the vehicle during movement of the vehicle between the travelling position of FIGS. 3A and 3B and the loading position of FIGS. 4A and 4B without requiring decoupling of the vehicle from the towing vehicle (not shown). Sections 21 and 22 of screw 11 are of opposite hand and load sharing arm 7A results in the vehicle having a load sharing tandem wheel configuration. As a consequence, one arm 1 is a leading arm and the other is a trailing arm.

Figure 3B:
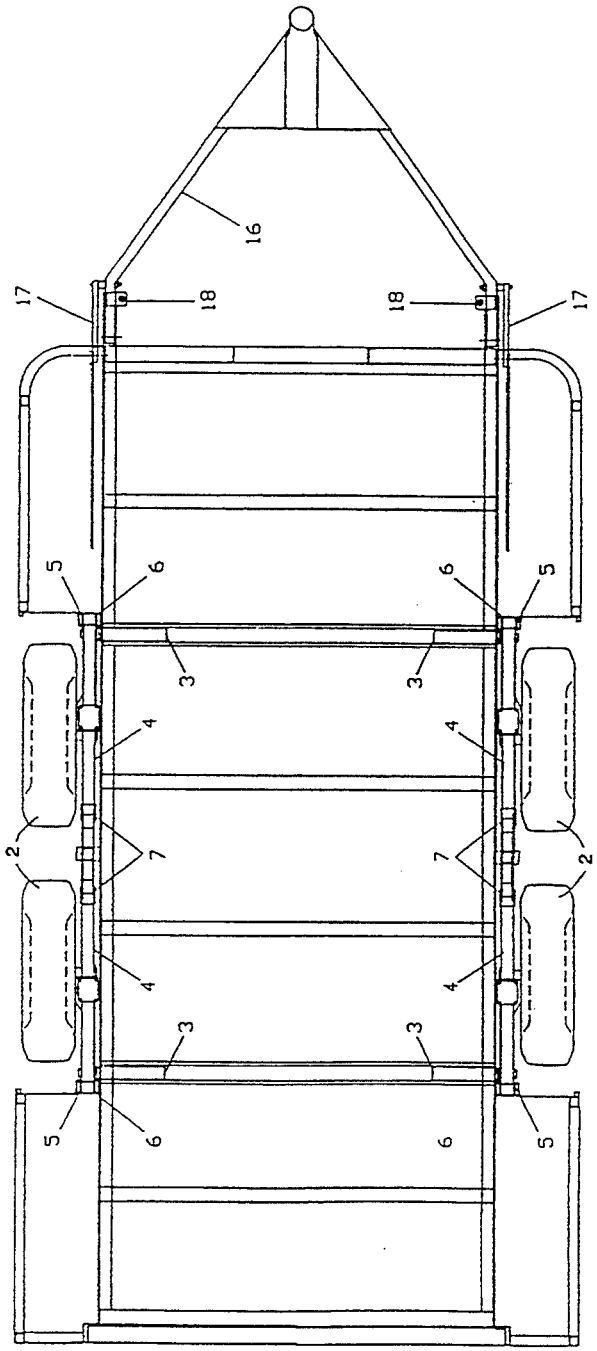
FIG. 3B is a sectional view thereof taken along the line 3B—3B of FIG. 3A.

To cause the vehicle to move from the FIGS. 3A and 3B travelling position sprocket 13 is driven to rotate screw 11. This in turn causes one end of component 4 and the end of strut 9 secured to it to move along guide member 6. The other end of strut 9 with guide block 10 is caused to travel along screw 11. This action pivots arm i and raises one end of component 4 and raises wheels 2. Simultaneous with this action links 17 pivot assembly 16 to ensure that the vehicle retains a horizontal attitude when the suspension is raised to cause lowering of the vehicle to the loading position of FIGS. 4A and 4B. Chain 14 links sprockets 13 on sides of the vehicle and the chain may be driven by sprocket 15.

To move the vehicle from the FIGS. 4A and 4B loading position to the FIGS. 3A and 3B travelling position sprocket 13 is rotated in the reverse direction to lower the suspension and return the vehicle to the attitude of FIGS. 3A and 3B.

FIG. 1A shows greater detail of part of the vehicle suspension and components for raising and lowering the suspension. Support arm 1 is shown pivotally coupled to axle 3. In this drawing numeral 2 shows where the wheel (omitted for the sake of clarity) would normally be mounted. Shackle 8 is pivotally coupled to extend between arm i and suspension component 4. One end of component 4 is connected to strut 9 and is received within guide member 6. The other end of component 4 is coupled to shackle 7.

Extension 13a is secured to one end of screw 11 via a coupling 23. FIG. 1B shows detail of guide block 10, guide member 6A and the other or top end of strut 9.

Guide member 6A is of inverted C shaped configuration with two opposed short return flanges 24. The end of strut 9 is forked and has two spaced fingers 25 secured by fasteners 25A to a main strut member 26 provided by two L shaped members arranged in abutting side by side relationship. Slide blocks 5 extend between fingers 25 and member 6A and can either be short blocks pivotally attached to fingers 25 or alternatively are long strips extending along and secured to member 6A. Centre slide block 10 is pivotally coupled to strut 9 and is threaded to engage screw 11. Block 10 acts as a traveller and when screw 11 is rotated moves along member 6A to cause that end of strut 9 to move horizontally and the distal end of component 4 to move vertically within member 6. The lower end of member 6 has a bracket 12 secured to it and slide blocks 5 are secured to the one end of the spring assembly. When the vehicle is in the travelling position the strut is wedged between member 6A and bracket 12.

With reference to FIG. 4A, it can be seen that the wheels and suspension on each side of the vehicle are constructed in like manner. The screws 11 are linked to extension shafts 13A and sprockets 13. Sprockets 13 are driven by a chain 14 and the two drive sprockets 15 can be used to drive one chain 14 and hence screws 11. Either sprocket 15 may be driven by a crank (not shown) or a powered system.

FIGS. 5A and 5B and FIGS. 6A and 6B illustrate an alternative embodiment and like numerals are employed to indicate like components to that illustrated in other figures.

In these figures (FIGS. 5A and 5B and FIGS. 6A and 6B a vehicle having three pairs of wheels is shown. Unlike the load sharing tandem arrangement of FIGS. 3A and 3B and FIGS. 4A and 4B) these figures illustrate an independent multi-wheel arrangement.

The support arms 1 are all trailing arms and each is pivotally coupled to the vehicle by an axle 3 and each has a wheel 2 mounted thereto for rotation. A suspension component 4 is coupled to extend between the strut 9 and an inclined frame member 30 of the vehicle. A shackle 7 secures one end of component 4 to the member 30. Strut 9 is normally aligned with guide member 6 when in the travelling position of FIG. 5. The vehicle has a similar tow bar assembly tilting mechanism to that described in relation to FIGS. 3A and 3B and FIGS. 4A and 4B).

The suspension shown in FIGS. 5A and 5B and FIGS. 6A and 6B can be raised to lower the vehicle either by a screw mechanism like that of FIGS. 3A and 4A or by an hydraulic arrangement to be described below. If a screw mechanism is used, because all arms 1 are trailing arms, the screw can have a thread of the same hand completely along an operative part of its length.

An hydraulic cylinder assembly 11a having a cylinder 31 and a rod 32 is shown with the rod retracted in FIG. 5. Extension members 33 extend the length of the rod 32. Slide blocks 10 like that illustrated in FIGS. 1A and 1B extend between the struts 9 and the extensions 33 or rod 32 and provide for pivotal movement between an end of the struts and the member 6A as the blocks move along member 6A. Extension of the rod 32 causes struts 9 to move from the FIGS. 5A and 5B to the FIGS. 6A and 6B position. This movement causes one end of the component 4 to move along member 6. That end of component 4 and the adjacent end of strut 9 is configured like that shown in FIG. 2B whereas the other end of each of the struts is configured as shown in FIG. 1B. Each arm 1 has a shackle 8 extending between it and component 4.

FIG. 2A shows greater detail of the vehicle suspension. Like components are given like numerals to that used in FIG. 1A. An hydraulic cylinder assembly 11a having a cylinder 31 and a rod 32 is shown. Side blocks 10 like that of FIG. 1A are coupled between each strut 9 and the rod 10 or extension members 33 as the case may be. FIG. 2B shows the manner in which the distal end of component 4 is received by the guide member 6. Slide blocks 5 slide within the member 6 and a seal 34 extends between the return flanges of member 6 and the strut 9. In full outline the rod 32 is shown retracted. When extended, the components assume the broken line position.

I claim:

1. A vehicle in the form of a non-tilting trailer adapted to be mounted and coupled to a second vehicle, comprising:
   (A) at least one pair of wheels,
   (B) a respective wheel support arm associated with each said wheel for supporting the wheel for rotation, one end of said arm being pivotally coupled to the vehicle,
   (C) a respective suspension component secured to said arm and a mounting on the vehicle and having a distal end,
   (D) a respective support strut on each side of the vehicle having one end secured to said distal end of a respective said suspension component,
   (E) a respective guide member for receiving said one end of said strut and said distal end of said suspension component for movement therealong when the vehicle is moved between a travelling position and loading position,
   (F) a generally horizontal bed supporting said guide members, said vehicle bed resting on ground level in the loading position and on the wheels in the travelling position, and
   (G) a tow bar assembly pivotally mounted and coupled to at least one said strut by link members whereby said tow bar assembly is caused to pivot as the vehicle is moved between the travelling and loading positions while the vehicle is mounted and coupled to a second vehicle, so that the vehicle bed remains horizontal throughout movement.

2. The vehicle of claim 1 wherein the suspension component is a leaf spring assembly, an intermediate part of the spring assembly being secured to the support arm.

3. The vehicle of claim 2 wherein the intermediate part of the spring assembly is secured to the arm by a shackle which is free to pivot relative to both the intermediate part and the arm.

4. The vehicle of claim 1 wherein the guide member is channel shaped in transverse section and receives the distal end of the suspension component and the one end of the strut within it for movement therealong.

5. The vehicle of claim 4 wherein at least one of the channel and the one end of the strut has friction resisting material mounted to it.

6. The vehicle of claim 5 wherein the one end of the strut has a friction resisting slide block mounted to it.

7. The vehicle of claim 5 wherein the channel has opposed return flanges and including sealing material between the return flanges and the strut.

8. The vehicle of claim 1 wherein the strut is substantially T shaped in transverse cross section with a central flange thereof being received by the guide member when the vehicle is in the travelling position.

9. The vehicle of claim 1 wherein the strut has forked attachment ends.

10. The vehicle of claim 1 including two pairs of said wheels and wherein the arms associated with one of the pairs of wheels are leading arms and the arms associated with the other said pair of wheels are trailing arms.

11. The vehicle of claim 10 wherein the suspension components on one side of the vehicle are pivotally coupled by attachment members to opposite ends of a load sharing arm and said load sharing arm is pivotally connected to the vehicle.

12. The vehicle of claim 10 including a respective drive associated with the wheels on each side of the vehicle for moving the other end of the strut on that side of the vehicle longitudinally of the vehicle to cause the vehicle to move between the travelling and loading positions.

13. The vehicle of claim 12 wherein the drive includes a threaded shaft on each side of the vehicle and each said shaft having threaded portions of opposite hand with the struts on one side of the vehicle being connected to respective ones of the threaded portions of the associated shaft.

14. The vehicle of claim 13 wherein the other ends of the struts terminate in threaded followers for engaging the threaded portions.

15. The vehicle of claim 14 including a strut support guide member on each side of the vehicle for receiving a respective threaded shaft and respective followers.

16. The vehicle of claim 13 wherein the shafts on the sides of the vehicle are linked for rotation.

17. The vehicle of claim 16 wherein the shafts are linked by a chain driven by a sprocket.

18. The vehicle of claim 1 including at least two pairs of wheels and the arms associated with the wheels all being trailing arms, said suspension components being coupled to the vehicle by respective attachment members.

19. The vehicle of claim 18 including a respective drive associated with the wheels on each side of the vehicle for moving the other end of the struts on that side of the vehicle longitudinally of the vehicle to cause the vehicle to move between the travelling and loading positions.

20. The vehicle of claim 19 wherein the drive includes an hydraulic cylinder assembly having a rod and a cylinder, the rod being coupled to an associated leading strut with an extension member extending between said leading strut and an associated following strut.

21. The vehicle of claim 20 wherein said cylinder assemblies are double acting hydraulic cylinder assemblies.

22. The vehicle of claim 20 wherein the other ends of the struts are pivotally coupled to the rod or the extension member by friction reducing slide blocks.

23. The vehicle of claim 22 including a strut support guide member on each side of the vehicle for receiving respective said slide blocks, said rod and said extension member and guiding said slide blocks for longitudinal movement of the vehicle.

24. The vehicle of claim 1 wherein said tow bar assembly is so mounted and coupled that said tow bar assembly is caused to pivot whenever the vehicle is moved between the travelling and loading positions, regardless of whether or not the vehicle is mounted and coupled to a second vehicle.

* * * * *